E. T. CURRAN.
AIRPLANE RADIATOR.
APPLICATION FILED NOV. 18, 1918.

1,389,745.

Patented Sept. 6, 1921.
5 SHEETS—SHEET 1.

Inventor
EDWARD T. CURRAN.

By Raymond A. Parker
Attorney

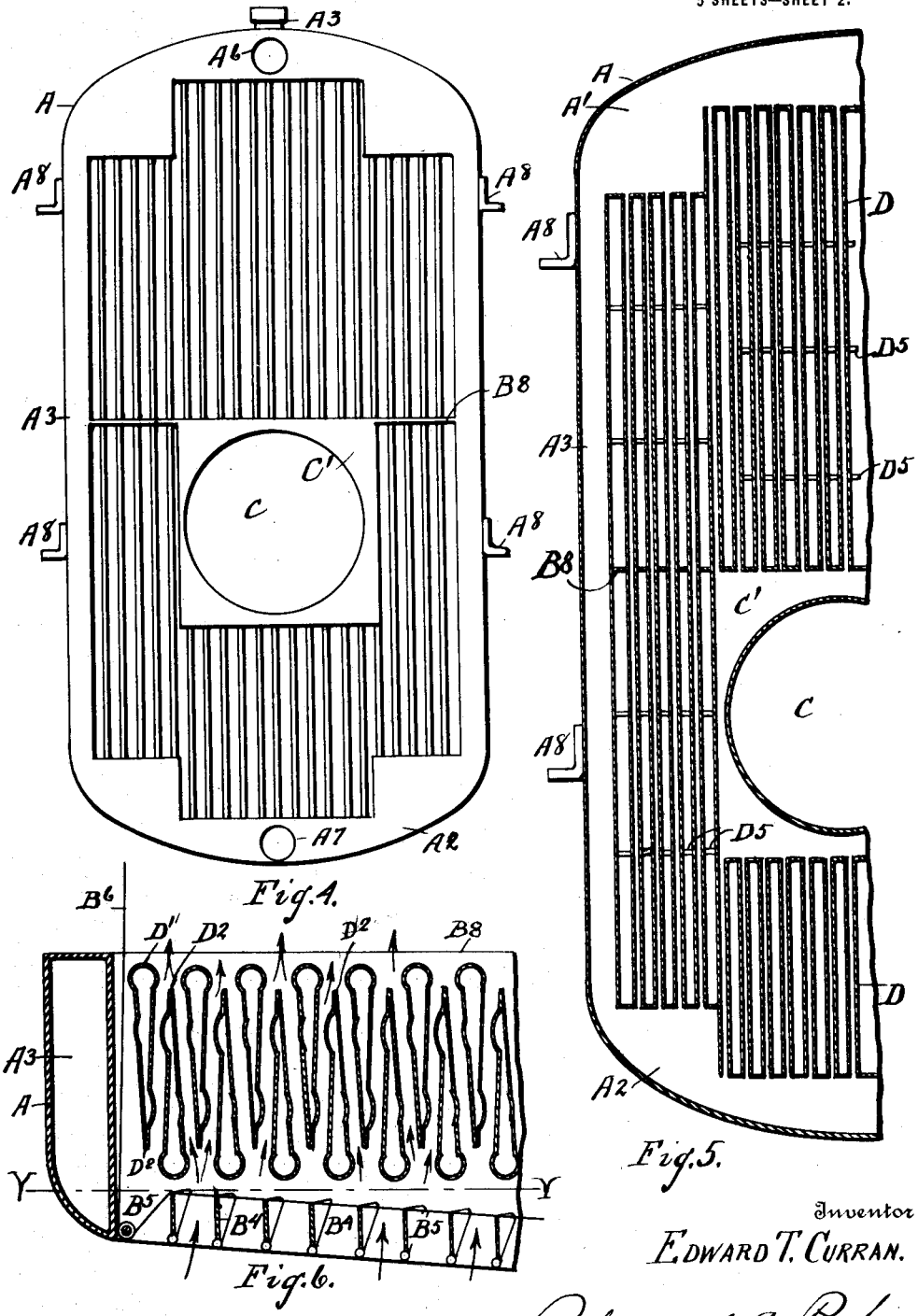

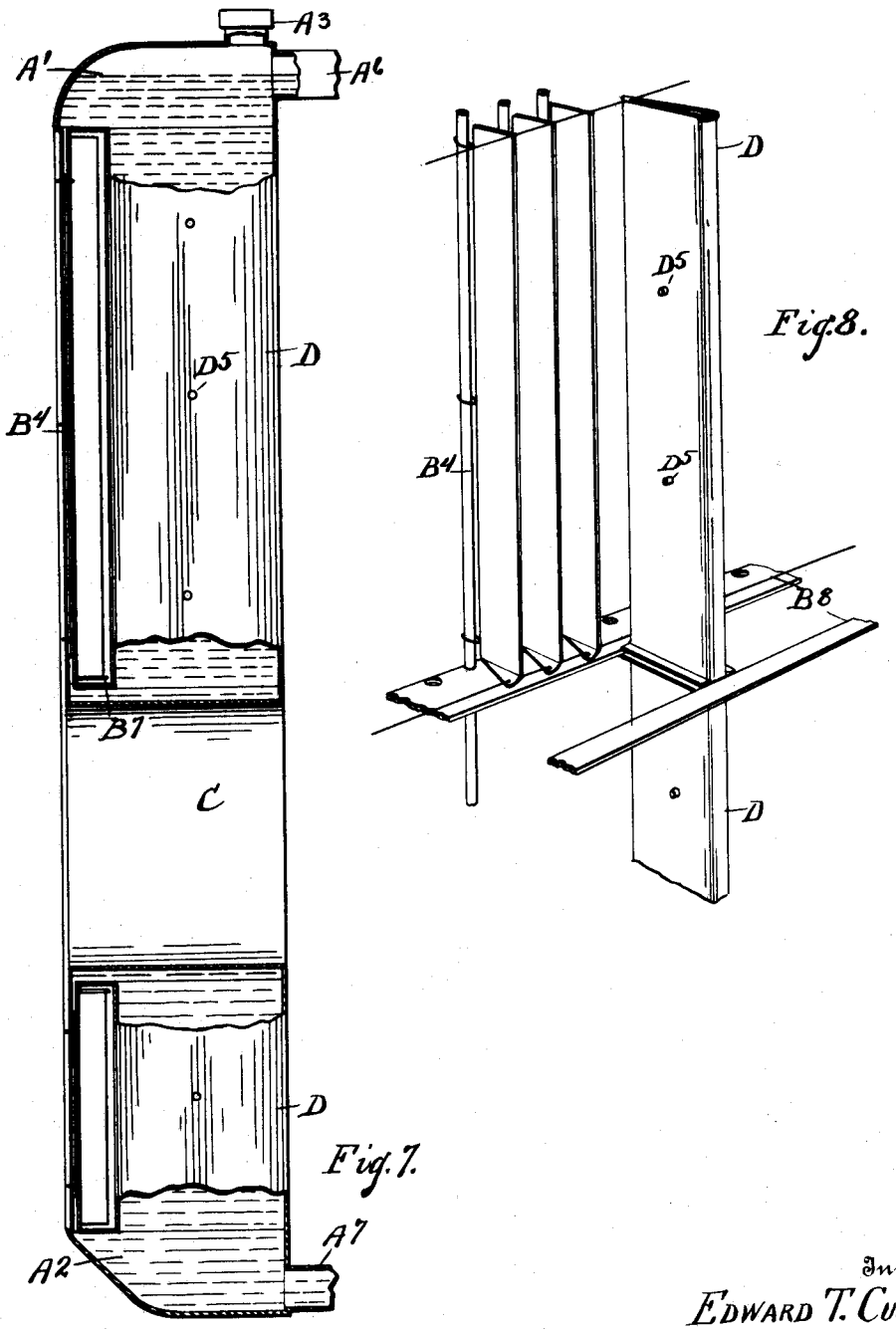

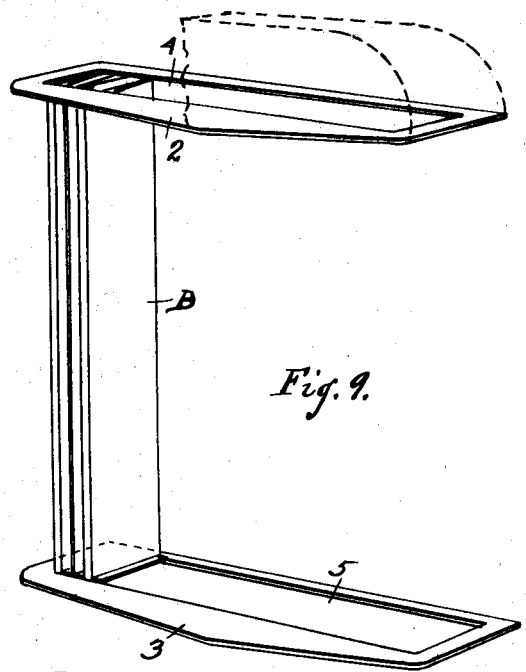
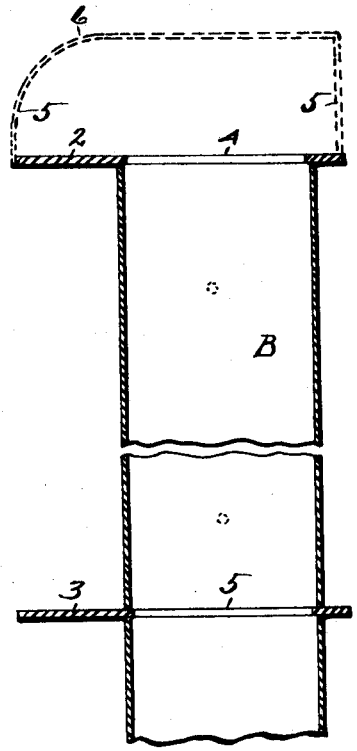
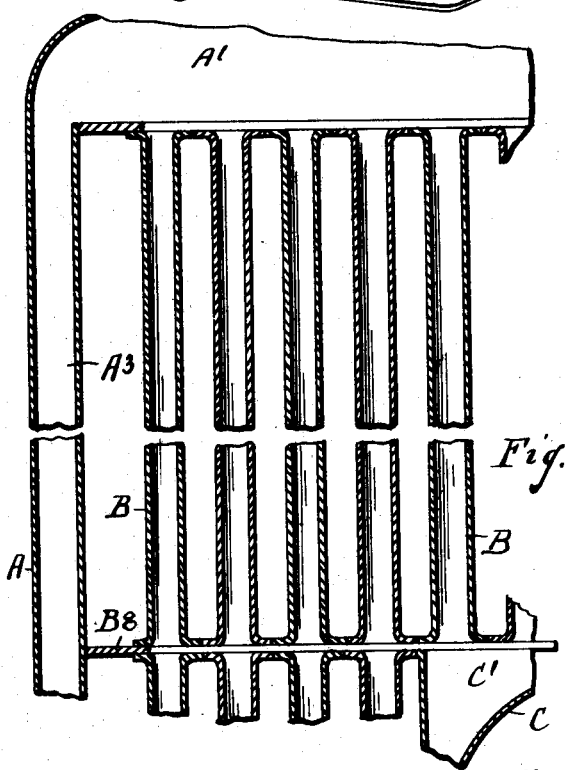
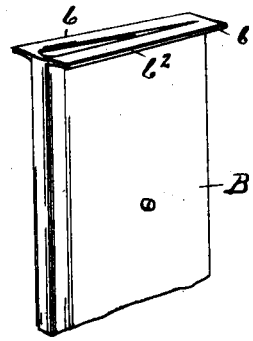

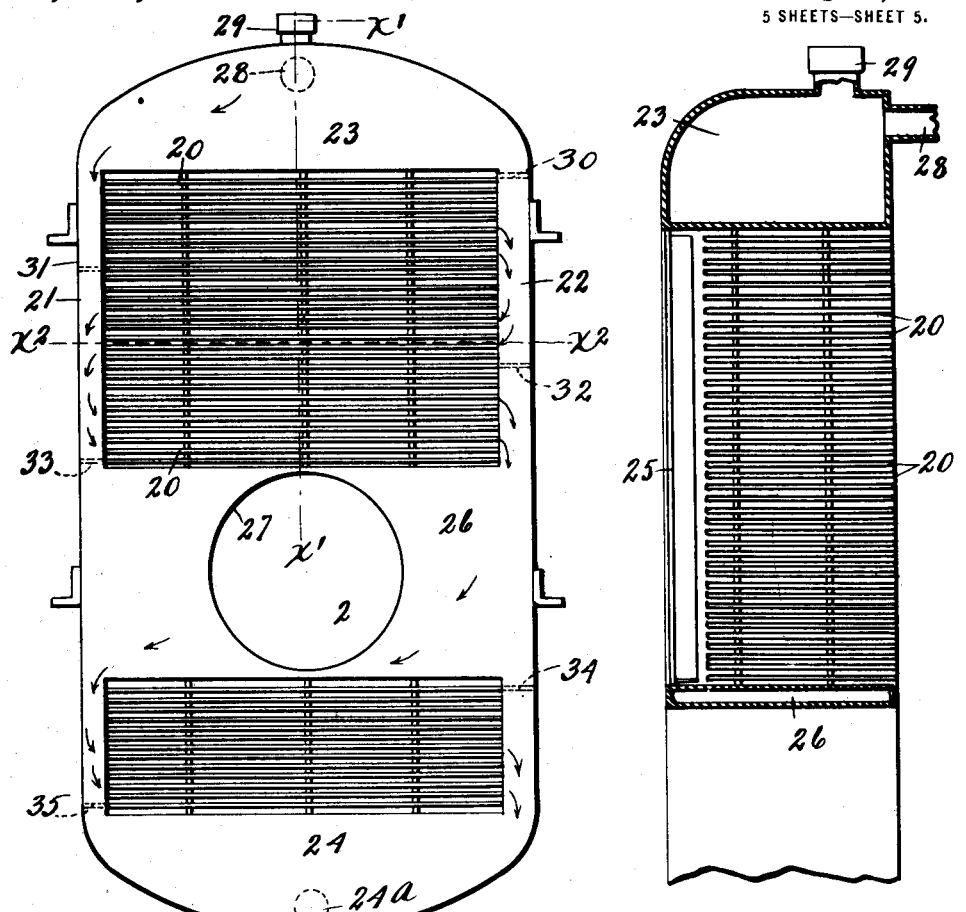
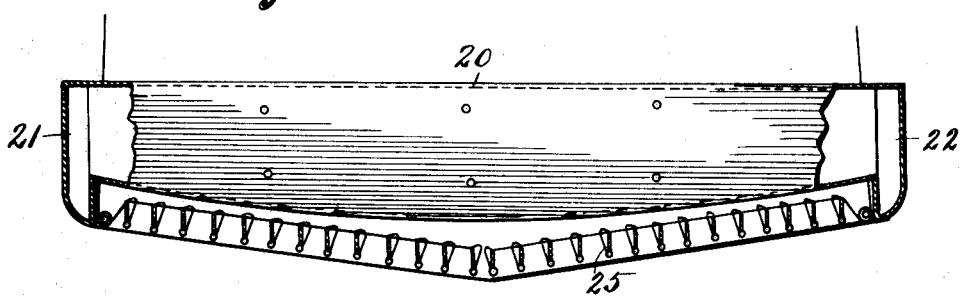

UNITED STATES PATENT OFFICE.

EDWARD T. CURRAN, OF DETROIT, MICHIGAN.

AIRPLANE-RADIATOR.

1,389,745.   Specification of Letters Patent.   Patented Sept. 6, 1921.

Application filed November 18, 1918. Serial No. 262,951.

*To all whom it may concern:*

Be it known that I, EDWARD T. CURRAN, a citizen of the United States, residing at Detroit, county of Wayne, State of Michigan, have invented a certain new and useful Improvement in Airplane-Radiators, and declare the following to be a full, clear, and exact description of the same, such as will enable others skilled in the art to which it pertains to make and use the same, reference being had to the accompanying drawings, which form a part of this specification.

My invention relates to radiators adapted to be used for high power airplanes although the improvements here may be used for any internal combustion engine that is necessary to be water cooled. It is well known that airplane engines pass through great ranges of temperature, are subject to very high and severe air currents due to the speed of the airplane, and that consequently great flexibility as to cooling is required in them and also that they shall be made in the strongest manner, and that they shall not be liable to injury by freezing.

It is further well known that soldered joints even in automobile construction are quite unreliable and the breaking away of them will cause frequent leaks. This defect is enormously exaggerated in airplanes owing to the severe service which the radiator thereof must undergo.

My invention has for its object the production of a radiator in which the seams and joints can be welded by gas or electricity of such shape as to conform to airplane arrangements to the best advantage, capable of adjustment to suit various conditions of atmosphere, afford ample cooling means necessary and by adjustments to modify such means as may be desired or necessary, and thus at once accomplish all the requirements of a successful radiator for airplane service (though not limited to such service) and thus remove all of the difficulties that have been heretofore experienced.

To accomplish these purposes I use the lightest form of steel capable of autogenously welding with a peculiar arrangement of the parts to permit such welding so that when the parts are welded together they become a homogeneous unit; the steel so used when the radiator is finished is treated inside and outside by a rust proofing process which prolongs its life and for this purpose any of the well known rust proofing process may be used, even copper or zinc plating.

In the drawing:

Fig. 4 is a rear view of the radiator detached.

Fig. 5 is an enlarged front view of the radiator tubes on a section Y—Y of Fig. 6.

Fig. 6 is a view on an enlarged scale of a portion of Fig. 3 showing a preferred form of water tubes and their relation to the other parts of the radiator more clearly.

Fig. 7 is a vertical sectional view on the line W—W of Fig. 2, partially sectioned to show the interior of the header tanks at top and bottom.

Fig. 8 is a perspective view of the arrangement of the shutters and also of one of the water tubes.

Fig. 9 illustrates the mode of assembling preparatory to welding.

Fig. 10 is a sectional view through any one of the tubes showing the relation of the tanks to the tubes.

Fig. 11 is a sectional view horizontally through the radiator showing the method of welding the water tubes to each other and to the header.

Fig. 12 is a perspective view of one of the water tubes showing the end flanged preparatory to welding.

Fig. 13 is a front view of the radiator with the shutters removed.

Fig. 14 is a vertical section of Fig. 13 on the line X'—X'.

Fig. 15 is a cross section of Fig. 13 on the line $X^2$—$X^2$.

Similar letters refer to similar parts.

Figure 1:
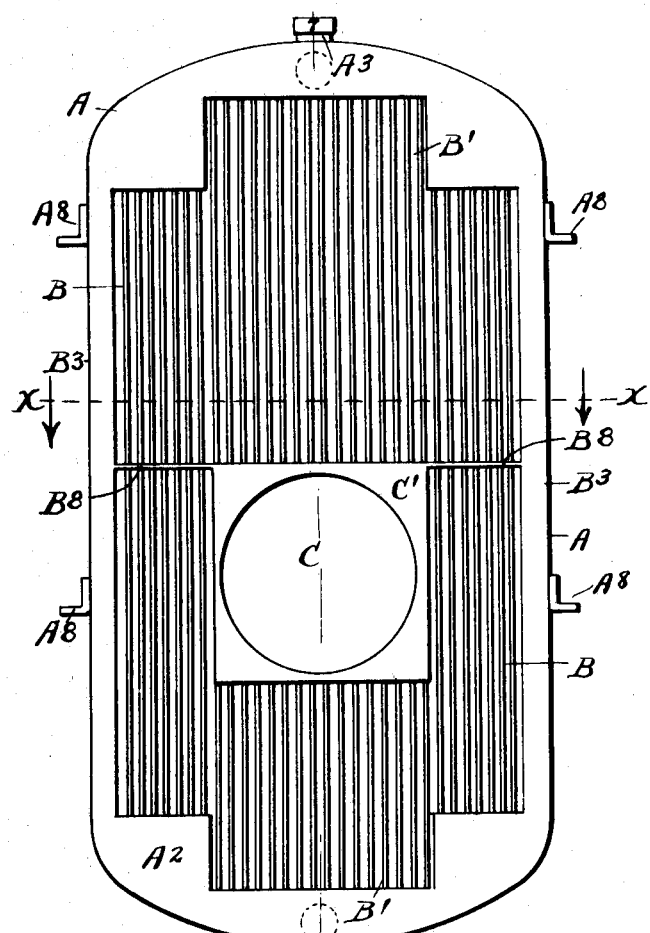
Figure 1 is a front view of the radiator.
Figure 3:
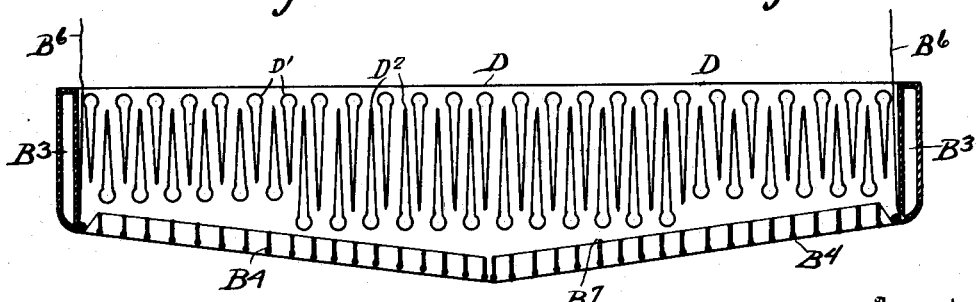
Fig. 3 is a transverse sectional view on the line X—X of Fig. 1.

In the drawings A represents the outer shell, A' is the outer portion of the top header tank through which the water tubes communicate, and $A^2$ is the bottom tank. $A^3$ is the usual filling hole. Vertical rods or tubes, which may be used as water tubes, B B extend from top to bottom and there are two communications with water spaces. In the center at C is the usual open space for the propeller shaft of an airplane, which space could be omitted and tubes or rods B B could be extended entirely through the radiator from end to end. C' is a water tank space surrounding the opening C and extending tubes as B' B' communicate with this water tank or space C' at the top or bottom thereof. Fig. 3 is a cross section of this arrangement on the line X—X of Fig. 1, as stated, and shows that the side walls of the radiator are preferably hollow at B³ and also communicate with the top tank A' and bottom tank A². The nose presented to the atmosphere in cross section is of the shape shown in Fig. 3. Upon the tubes or rods B B are mounted a series of vanes B⁴ B⁴ being pivoted or swiveled thereon as shown more particularly in Fig. 6. These vanes are arranged in two series and when open, as shown, in Fig. 6, afford an uninterrupted passage for the air through the bottom of the radiator. One-half of these are united by a cross rod or chain B⁵ and this is carried back to the aviator's seat within convenient range whereby he is enabled to close the vanes upon the side of the radiator to which the line B⁵ is attached. A similar connection is shown at B⁷ upon the other side of the radiator so that either half of the radiator may be closed off or partially closed off at will, or the vanes may be entirely shut off against the rods or tubes B or B' against the resistance of the atmosphere when the airplane is in motion by simply loosening up; by letting go of the lines B⁶ B⁷ the air pressure will open the shutters B⁴ to the position shown in Fig. 5. By this means the flow of air can be regulated to the airplane or shut off entirely. Just behind this series of tubes or rods and shutters is a series of flattened water tubes as shown in the enlargement Fig. 6. These water tubes are lettered D D. As shown in Fig. 3, those in the center of the airplane are wider in cross section than those at the edge. They are made by taking strips of sheet steel, bending them over at D', bringing the further edges together, and welding them together at D² the point of junction, flattening them so as to leave a very narrow space between the walls and therefore a very thin sheet of water therein. The water space however is a trifle wider at one side of the tube or water plate than it is at the welded side and these are preferably arranged alternately, as shown in Fig. 6, forming water columns reaching from the header or tank A' down to the tank A² except as they are interrupted in the center of the radiator where they are wider. They reach from the tank A' to the tank C' and from the tank A² to the tank C' being interrupted for the purpose of allowing the orifices C to exist. As many of these flattened tubes as can be inserted and afford air space are provided. They are welded into the header walls of the tank A', header walls of tank A² and the walls of the tank C'. The side walls of the flattened tubes may be corrugated if desired. The corrugations however will increase the amount of surface and somewhat impede the circulation of the atmosphere. A perspective view of one of these tubes is shown as a part of Fig. 8 and also a perspective view of the shutters. Upon the side walls of these tubes are welded small knobs or projections D⁵. These projections are for the purpose of staying the side walls with respect to the adjacent tubes and preventing their expansion sufficiently to cause the air passage between the tubes to close. There would be some spring to the side walls but in case of pressure the side walls might expand so that the air passage or passages would close and when the pressure was removed they would return to their original shape. While it would be mechanically practicable to form knobs by riveting them through the side walls, such construction would result in danger of leakage by either corrosion or loosening of the knobs or of some of them. I prefer therefore to weld them in place and to the surface of the tube without perforating the side walls of the flattened tubes. The upper tank or header A' is connected to the engine by an inlet A⁶ and the lower tank A² is also connected to the engine in the usual way by an outlet A⁷. Double manifolds such as are common in eight or twelve cylinder engines may be employed. Supporting lugs A⁸ A⁸ may be welded to the outer shell for the purpose of attaching the radiator to supports if desired. It is obvious that the radiator would be arranged in that regard differently for different purposes.

Figure 2:
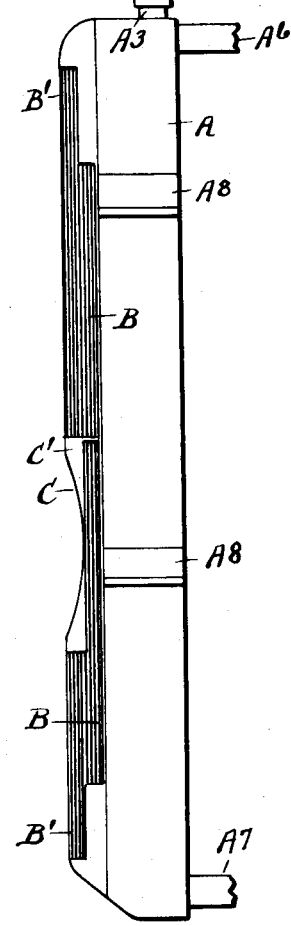
Fig. 2 is a side view.

It is obviously very difficult to autogenously weld an article that is as complicated in respect to the number of points to be welded as the radiator of the type described. I have devised a system of welding which accomplishes the purpose of constructing such a radiator in the simplest and most efficient manner. I have illustrated such system in Figs. 9, 10, 11 and 12. In Fig. 12 I have shown one of the water tubes B with an outwardly flanged upper end b b'. The tubes with these flanged ends, it will be understood, will be brought together at top and bottom and be held with the edges of the flanged end in juxtaposition. In Fig. 9 I have shown three of these so arranged and several of them shown in section as assembled in the radiator in Fig. 11. The edges B² of these flanged ends are brought together as stated to form a series of flattened tubes with ends welded together and forming spaces double the width of the flanges between the tubes. The tubes on each side are thus arranged. Flat plates 2, 3 have rectangular spaces 4—5 cut in them which are slightly narrower than the width or diameter of the tube as shown in Fig. 10. These plates are then welded to each corner formed by the juxtaposition of the tubes and upon the plates is thereupon built afterward a tank having side walls 5 and cover 6. The lower tank A² is formed up in the same manner. Joints forming the material of the tank are also welded in the same manner. This forms a radiator proper with the water tubes communicating with the tanks thus formed and the air spaces being maintained between the tubes as stated. Of course, there is nothing new in forming up a tank by welding but it would certainly be very difficult if not impossible to weld the tubes to the tank and I know of no system except the peculiar one devised by me by which such welding can be made. A stay sheet B³ forms a cut-out piece surrounding the tubes and may also be welded to the sides of the tubes or the tubes may be shortened and supported in the manner shown in Fig. 2 by making the tubes with a stay sheet and continuing them by making a series of tubes underneath the stay sheet as shown in Fig. 11. It is unnecessary to describe the specific detail as to this because the describing of one answers for all, there being no difference in the method of uniting the joints between the upper and lower end or between the ends and the stay sheet and it would needlessly extend description to state how each is welded in detail.

In Figs. 13, 14 and 15 I have shown a modification of the radiator in which the tubes, which are similar to those shown in the former figures, are arranged horizontally and welded to headers. The building up of this form is done the same as in building the former construction described. The nest of tubes is arranged in a jig with the flaring ends of the tubes touching and the ends are welded together. A perforated plate to engage the corners of the tubes thus welded is also welded to the tubes, at the corners of the tubes and the outer water header is built up on the plate by appropriate pieces thereto and a cover thereon in the same manner as hereinbefore described. In these drawings, Figs. 13, 14 and 15, 20—20 are the tubes. 21—22 are the headers; 23—24 are the top and bottom tanks which are welded to the headers. 25 in Fig. 14 represents the shutters which are not shown in Fig. 13. In Fig. 14 the parts are enlarged, 26 being the water tank which surrounds the pole 27 for the propeller shaft. 28 is an inlet connecting with the engine and 29 the filling hole. The shutters are controlled in the same manner exactly as heretofore described. The mode of operation is the same as hereinbefore described with one exception, namely at 30 is a baffle plate closing off the tank 23 from the header 22. At 31 there is another baffle plate inserted in the header 21, and at 32 is another baffle plate inserted in the header 22, and at 33 is another baffle plate inserted in the header at the lowest water tube above the water space 26, and at 34, is another baffle plate inserted in the header at the topmost plate below the tank 26 and in the header 22. At 35 is the last baffle plate inserted below the lowest water tube in the header 21. The effect of these is to compel the circulation of the water in its descent through the water tubes on the left of Fig. 13 that are above the baffle plate 31 and the circulation to return through the tubes that are above the baffle plate 32 and also to return again through the tubes that are above the baffle plate 33, returning again to the right hand side through the tubes that are above the baffle plate 35. This compels a tortuous circulation of the water from the top of the radiator to the bottom and out through the manifold 24ᵃ as shown by the arrows.

What I claim is:

In a radiator, a series of water tubes formed with a beaded edge on one side thereof, the other edge being united by welding, the two plates being wider apart at the beaded edge than at the welded edge, the alternate tubes being arranged obversely so that the welded edge of one would be opposite the beaded edge of the adjacent one and the beaded edge opposite the welded edge, substantially as described.

In testimony whereof, I sign this specification.

EDWARD T. CURRAN.